Figure 1:
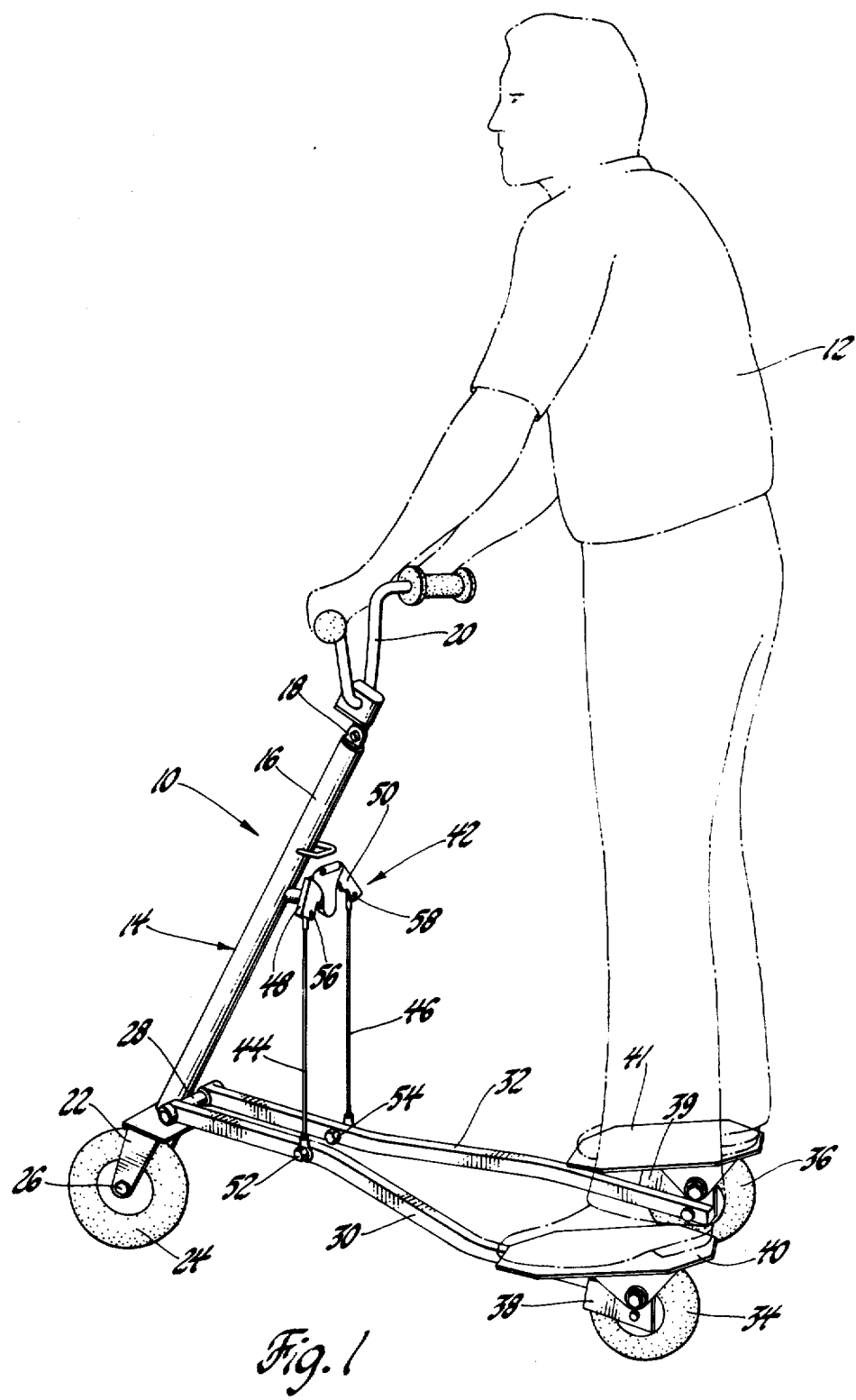

United States Patent [19]

Denzer et al.

[11] 4,050,712
[45] Sept. 27, 1977

[54] CAMBERING DEVICE FOR CAMBERING VEHICLE

[75] Inventors: Richard E. Denzer, Bloomfield Hills; Gerald J. Marsh, Warren; Horacio Shakespear, West Bloomfield, all of Mich.

[73] Assignee: General Motors Corporation, Detroit, Mich.

[21] Appl. No.: 727,590

[22] Filed: Sept. 28, 1976

[51] Int. Cl.[2] .................. B60G 19/00; B62K 15/00
[52] U.S. Cl. ........................ 280/278; 280/112 A; 280/221; 280/293
[58] Field of Search .............. 280/278, 287, 87 R, 280/87 B, 112 R, 112 A, 6 R, 6 H, 6.1, 6.11, 200, 210, 218, 220, 221, 224, 21 R, 21 A, 12.1, 12 H, 282, 283, 293; 180/25 R, 25 A, 26 R, 41

[56] References Cited

U.S. PATENT DOCUMENTS

| 1,703,174 | 2/1929 | Roe | 280/287 X |
|---|---|---|---|
| 2,593,974 | 4/1952 | Brown | 280/21 R |
| 2,696,387 | 12/1954 | Nordin | 280/96.2 |
| 2,771,145 | 11/1956 | Peters | 180/26 |
| 2,887,322 | 5/1959 | De Mange | 280/112 A |
| 3,033,585 | 5/1962 | Marston et al. | 280/12.1 X |
| 3,229,782 | 1/1966 | Hilton | 180/26 |
| 3,623,749 | 11/1971 | Jensen | 280/287 X |
| 3,964,563 | 6/1976 | Allen | 280/41 X |

FOREIGN PATENT DOCUMENTS

| 609,578 | 8/1956 | Germany | 280/112 A |
|---|---|---|---|
| 454,337 | 1/1950 | Italy | 280/293 |
| 49-42586 | 11/1974 | Japan | 280/87 R |

*Primary Examiner*—Joseph F. Peters, Jr.
*Assistant Examiner*—Jack D. Rubenstein
*Attorney, Agent, or Firm*—Edward J. Biskup

[57] ABSTRACT

A cambering vehicle having pivoted trailing arms interconnected through a cambering device including a bell crank consisting of two wing members which are connected together by a gearing arrangement and combined with a lever-operated locking device that allows the trailing arms to be freely movable for normal operation of the vehicle and to be folded towards the vehicle frame so as to provide a compact package when the vehicle is to be stowed.

3 Claims, 4 Drawing Figures

CAMBERING DEVICE FOR CAMBERING VEHICLE

This invention concerns cambering vehicles and more particularly relates to a cambering vehicle having a cambering device that incorporates a bell crank consisting of two separate gear connected parts that can be locked in three different positions so as to permit the vehicle to be operated normally, collapsed into a compact configuration, or parked on a level surface.

Copending patent application Ser. No. 727,594, filed Sept. 28, 1976, entitled "Cambering Device For Cambering Vehicle" and assigned to the assignee of this invention discloses a cambering vehicle in which the cambering device has a bell crank consisting of a pair of wing members mounted in a support member by a pivot pin for independent pivotal movement about a common axis. Each wing member has three holes formed therein, the centers of which are located on a circle having its center coaxially with the center axis of the pivot pin. The wing members are in overlapping relationship with a lock device which includes a lever-operated locking pin that is adapted to extend in registering holes in the wing members for securing the latter together in a first position wherein the trailing arms are located for normal operation of the vehicle, in a second position wherein the trailing arms are located adjacent the steering frame for stowage purposes, and in a third position so as to allow parking of the vehicle.

The present invention is directed to a cambering device of the above-described type that is characterized in that it has the two wing members connected together through a gearing arrangement that permits coordinated movement of the wing members. In this manner, positioning of the wing members for locking purposes is facilitated so that the vehicle can be placed in the parked, normal operating, or stow position by the operator with a minimum of effort. More specifically, the cambering device according to this invention comprises a T-shaped support member that is mounted on the steering frame for rotational movement about an axis extending longitudinally of the vehicle. A bell crank is carried by the support member and consists of two wing members which are pivoted at spaced points on the support member and interconnected by a gearing arrangement so that movement of one wing member is coordinated with the other wing member. Each of the wing members have two positioning holes and a positioning notch formed therein and the support member includes a lever-operated locking device having a pair of locking pins which cooperate with the positioning holes and notch for placing the bell crank and accordingly the trailing arms of the vehicle in a parked position, normal operating position, and a stow position.

The objects of the present invention are to provide a new and improved cambering vehicle having pivoted trailing arms and including a cambering device that has a two-piece bell crank carried by a pivoted support member which carries a locking device for selectively securing the two members of the bell crank in different relative positions so that the trailing arms move relative to each other during normal vehicle operation and can be locked to each other when the vehicle is to be stowed or parked; to provide an improved cambering device for a cambering vehicle having a bell crank consisting of a pair of substantially identical wing members which are geared together for coordinated movement about a pair of spaced axes and can be locked in three different angularly related positions so as to permit the vehicle to be parked, operated in a conventional manner, or collapsed into a low profile configuration for stowage purposes; to provide an improved cambering device for a cambering vehicle which through a lever-operated locking pin allows two gear connected parts of a bell crank to be rotated into predetermined positions relative to and in engagement with the steering frame for collapsing the steering frame towards the trailing arms and for maintaining the trailing arms in a parked position; and to provide an improved cambering device for a cambering vehicle having pivoted trailing arms that consist of a pair of interconnected synchronously movable wing members combined with a locking arrangement that allows the vehicle to be placed in a parked condition by moving the steering frame forwardly about its pivot connection with the trailing arms.

Figures 2, 4:
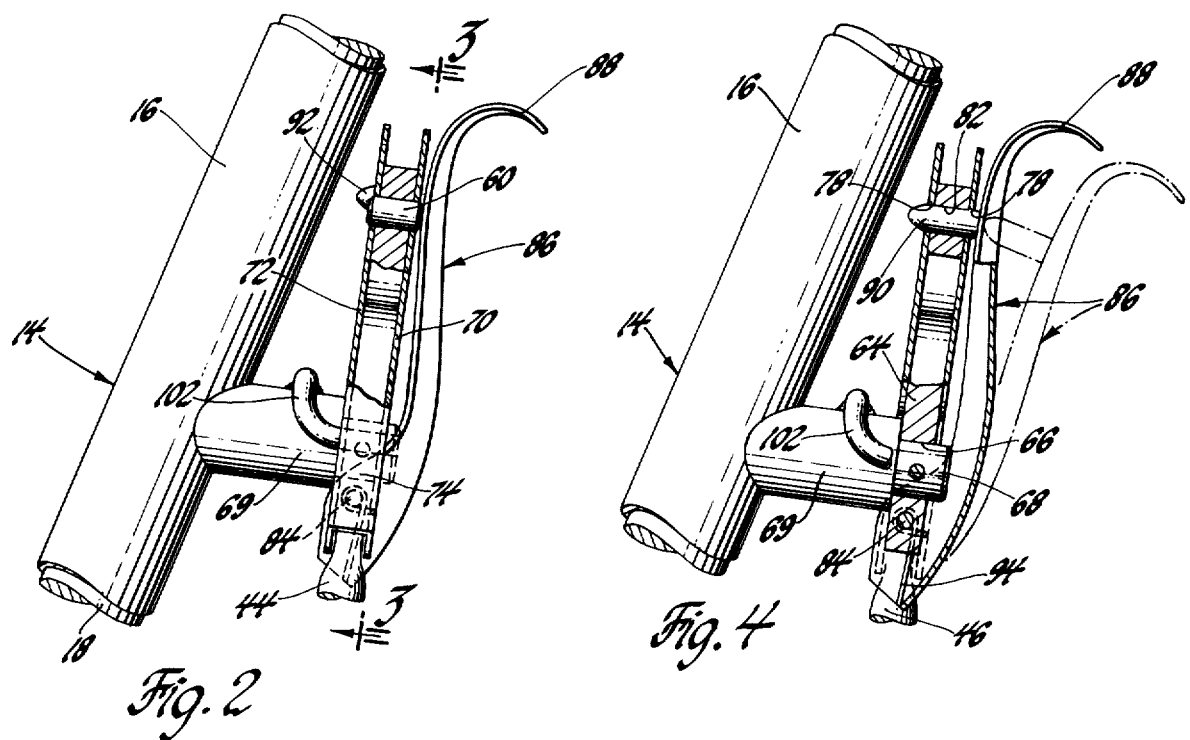
Figure 3:
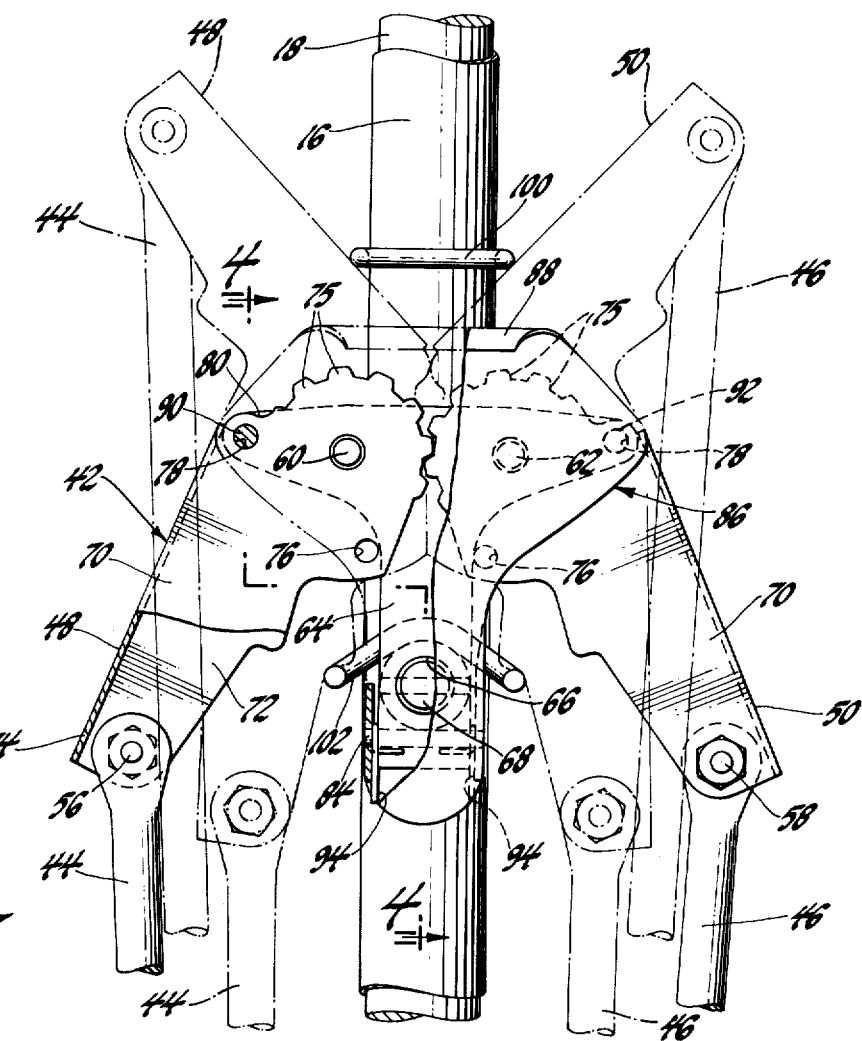

Other objects and advantages of the present invention will be more apparent from the following detailed description when taken with the drawings in which:

FIG. 1 is a perspective view showing a cambering vehicle incorporating a cambering device made in accordance with the invention, FIG. 2 is a side elevational view showing a portion of the cambering device supported by the steering frame of the cambering vehicle of FIG. 1, FIG. 3 is a front elevational view taken on line 3—3 of FIG. 2 and shows parts of the cambering device in three different positions, and FIG. 4 is a sectional view taken on line 4—4 of FIG. 3.

Referring to FIG. 1 of the drawings, a cambering vehicle 10 is shown which is adapted to be propelled forwardly by the natural input of a vehicle operator 12 through the timed shifting of his weight from one foot to the other coordinated with the left and right cambered steering of the vehicle in a sinuous path. It will be noted that a vehicle of this type can be seen in copending patent application Ser. No. 649,967 filed on Jan. 19, 1976 and entitled "Cambering Vehicle" and reference is made to such application for a full understanding of how the vehicle is operated. It will also be noted that although a manually propelled vehicle is shown, an internal combustion engine or an electric motor can be combined with the vehicle for driving the front wheel thereof.

The cambering vehicle 10 comprises an upright steering frame 14 that includes a tubular column 16 which serves to axially align and rotatably support an elongated steering shaft 18 which extends therethrough. The upper end of the steering shaft 18 is provided with a handle bar assembly 20 while the lower end is formed with a fork 22 which rotatably supports the front wheel 24 of the vehicle. The wheel 24 rotates on an axle 26 which extends transversely through and is supported by the fork 22. The lower end of the tubular column 16 is rigidly formed with a transverse shaft 28, the outer ends of which pivotally support the front ends of a pair of trailing arms 30 and 32 which extend rearwardly and terminate with rear wheels 34 and 36 respectively supported for rotation by a pair of brackets 38 and 39, which in turn, pivotally support foot pads 40 and 41. A cambering device 42 made according to the invention serves to interconnect the trailling arms 30 and 32 and, when in the normal operating position, ensures that the pivotal movement of the trailing arms 30 and 32 about shaft 28 is equal and opposite. Thus, when the vehicle 10 is leaned into a turn, all wheels remain in contact with the ground and camber by an amount equal to vehicle roll.

More specifically, and as seen in FIGS. 1 and 3, the cambering device includes a pair of links 44 and 46 and a bell crank comprising a pair of wing members 48 and 50. The lower ends of the links 44 and 46 are connected to the front portions of the trailing arms 30 and 32 by transversely extending pivot bolt members 52 and 54, respectively, while the upper ends of the links 44 and 46 are connected to the wing members 48 and 50 by longitudinally extending pivot bolt members 56 and 58, respectively. Each of the pivot bolt members 56 and 58 includes a spherical bearing means (not shown) which allows the upper end of the associated link to pivot about an axis perpendicular to the longitudinal pivot axis of the pivot bolt member. Thus, each of the pivot bolt members 56 and 58 permits universal pivotal movement of the upper end of the associated link member. This allows the steering frame 14 to be folded towards the trailing arms 30 and 32 in a manner to be described hereinafter.

As seen in FIGS. 2, 3, and 4, the wing members 48 and 50 of the bell crank are supported for pivotal movement by a pair of laterally spaced pivot pins 60 and 62 carried by a T-shaped support member 64. The lower portion of the support member is formed with a cylindrical opening 66 which serves to mount the support member on a cylindrical shaft portion 68 for rotation about an axis extending longitudinally of the vehicle. The shaft portion 68 is integral with a boss 69 fixed with the column 16.

Each of the wing members 48 and 50 have a connecting portion that is channel shaped in cross section and includes a pair of parallel side walls 70 and 72 interconnected by a perpendicular wall 74. The outer ends of the three walls 70, 72 and 74 provide the connecting portion for each wing member that pivotally supports the upper end of the associated link. The inner ends of the side walls 70 and 72 of each wing member 48 and 50 are formed with a plurality of gear teeth 75 which serve to interconnect the wing members 48 and 50 and permit them to rotate together about the pivot pins 60 and 62. Two circular position apertures 76 and 78 of uniform diameter and a position notch 80 are formed in the side walls of each of the wing members 48 and 50, and are located on a circle having its center coaxial with the center of the associated pivot pin of the particular wing member. The position apertures and position notch of each wing member 48 and 50 are adapted to register with an aperture 82 formed in each end of the cross member portion of the T-shaped support member 64 in a manner and for purposes to be explained hereinafter.

The meshing engagement of the gear teeth 75 of wing members 48 and 50 permit the latter to be simultaneously rotated into three predetermined positions when in the unlocked condition. The latter mentioned three positions can be seen in FIG. 3 and can be referred to as a stow position when the connecting portions of the wing members 48 and 50 are located in the upper most phantom line position, a normal operating position when the wing members 48 and 50 are located in the full line position, and the park position when the connecting portions of the wing members are located in the lower most position shown in phantom lines. In the normal operating position and with the wing members locked to the support member 64, the bell crank is free to rotate about shaft portion 68 and through the links 44 and 46 control the pivoting up and down movement of the trailing arms 30 and 32 about the shaft 28. In the park and stow positions, the bell crank is locked as a unit to the steering frame 14 and through the links 44 and 46 maintains the trailing arms 30 and 32 in fixed positions.

The lower portion of the support member 64 carries a transverse pivot pin 84 the opposite ends of which supports the lower end of a hand-operated lever 86 which as seen in FIG. 3, has a generally "T" configuration. The upper end of the lever is curved rearwardly to provide a handle 88, and a pair of lock pins 90 and 92 are formed rigidly with the upper end and extend forwardly therefrom. The lock pins 90 and 92 serve to lock the wing members 48 and 50 to the support member 64 when the wing members are in the aforementioned normal operating, park, and stow positions. Thus, with the wing members in the full line position of FIG. 3, the lock pins 90 and 92 extend through the aperture 78 in each of the wing members and into the two apertures 82 in the support member 64. When the wing members are in the upper most phantom line position of FIG. 3, the lock pins 90 and 92 will extend through the apertures 76 in each of the wing members and, into the two apertures 82 in the support member 64, and with the wing members in the lower most phantom line position, notch 80 of each of the wing members will be located below the lock pins 90 and 92 which will extend into the apertures 78 in the support member 64 and lock the wing members to the steering frame 14. A spring 94 wound about each end of the pivot pin 84 serves to bias the lever 86 and, accordingly, the lock pins 90 and 92 towards the support member 64.

Located above and below the support member 64 and rigidly attached to the column 16 and the boss 69 are a pair of stop members 100 and 102. The lower stop member 102 serves a dual function in that it will limit pivotal movement of the bell crank about the shaft portion 68 when the wing members 48 and 50 are located in the full line or normal operating position of FIG. 3 during normal operation of the vehicle 10. In other words, while in the normal operating position, the bell crank will pivot about shaft portion 68 clockwise and counterclockwise as seen in FIG. 3 until the support member 64 contacts the stop member 102. In addition, the stop member 102 serves to prevent any pivotal movement of the bell crank about the shaft 68 when the wing members 48 and 50 are located in the lower most or park position as shown in phantom lines in FIG. 3. In the park position, the links 44 and 46 will serve to maintain the trailing arms 30 and 32 in fixed relative positions. Similarly, the stop member 100 serves to prevent rotation of the bell crank about shaft portion 68 when the wing members 48 and 50 are located in the upper most or stowage position shown in phantom lines in FIG. 3, and again the trailing arms 30 and 32 will be prevented from any relative movement.

From the above description, it should be apparent that the vehicle 10 is operated with the bell crank located in the full line or normal operating position as seen in FIGS. 1-5. Afterwards, if it is desired to place the vehicle 10 in a parked position, the operator merely grasps the handle 88 and draws it rearwardly causing the upper portion of the lever 86 to rotate in a clockwise direction (see FIG. 4) about the pivot pin 84. This movement causes the lock pins 90 and 92 to be withdrawn from the registering apertures 78 and 82 and allows the operator then to push the handle bar assembly 20 forwardly while maintaining his feet on the foot pads 40 and 41 on the trailing arms 30 and 32. The forward movement of the upper end of the steering frame 14 causes the latter to pivot about the shaft 28 in a counterclockwise direction as seen in FIG. 1 and causes the wing member 48 to rotate counterclockwise about pivot pin 60 and the wing member 50 to rotate clockwise about pivot pin 62 into the lower most phantom line position of FIG. 3 as limited by the stop member 102. At this point, the notch 80 in each of the wing members 48 and 50 will be located below the aperture 82 in the support member 64. The handle 88 will then be released so that the springs 84 will cause the lever 86 to move counterclockwise about the pivot pin 84 and insert the lock pins 90 and 92 into the apertures 82. Thus, the wing members 48 and 50 are trapped between the lock pins 90 and 92 and the stop member 102 so that rotation of the bell crank about pivot shaft 68 is prevented. If, subsequently, the operator desires to fold the vehicle 10 into a collapsed position, the lever 86 is again drawn rearwardly to retract the lock pins 90 and 92 from the apertures 82, and while maintaining the lock pins withdrawn, the steering frame 14 is then moved rearwardly about the shaft 28 towards the trailing arms 30 and 32 causing the wing members 48 and 50 to abut the stop member 100 and assume the upper most phantom line position of FIG. 3. At such time, the lever 86 is released causing the lock pins 90 and 92 to move into the aligned apertures 76 and 82. The stop member 100 then prevents any rotation of the support member 64 of the bell crank about the shaft portion 68.

It will be noted that the relative locations of the pivotal connections between the links 44 and 46, the bell crank, and trailing arms 30 and 32 will determine the extent to which the steering frame 14 will move towards the trailing arms. In other words, by proper positioning of the pivot connections and proper dimensioning of the links and bell crank, it is conceivable that the steering frame 14 can be collapsed into a position wherein it is substantially parallel to the trailing arms 30 and 32. In such case, the handle bar assembly 20 would engage the foot pads 40 and 41 so as to prevent any relative movement of the trailing arms 30 and 32 and the stop member 100 would not be required.

Various changes and modifications can be made in this construction without departing from the spirit of the invention. Such changes and modifications are contemplated by the inventors and they do not wish to be limited except by the scope of the appended claims.

We claim:

1. In combination with a cambering vehicle having a steering frame provided with a pair of pivotally supported trailing arms, a mechanical cambering device for interconnecting the trailing arms so they move in equal and opposite directions when the vehicle is leaned into a turn, said cambering device including a support member connected to said frame for pivotal movement about a first axis, a bell crank comprising a pair of wing members carried by said support member for pivotal movement about a pair of laterally spaced axes which are parallel to said first axis, gear means interconnecting said wing members for coordinating pivotal movement thereof about said laterally spaced axes, a pair of links, means pivotally connecting one of said links between one of said wing members and one of said trailing arms, means pivotally connecting the other of said links between the other of said wing members and the other of said trailing arms, one of said wing members having three positioning means formed therein, a spring biased lock pin carried by the support member and adapted to cooperate with said positioning means formed in said one of said wing members so as to selectively lock said wing members together in a first position wherein said trailing arms are located for normal operation of said vehicle, and in a second positon wherein said trailing arms are located adjacent said frame for stowing said vehicle in a minimum of space, and a third position wherein said support member is prevented from pivoting about the first axis so as to allow said vehicle to be parked on a level surface.

2. In combination with a cambering vehicle having a steering frame provided with a pair of pivotally supported trailing arms, a mechanical cambering device for interconnecting the trailing arms so they move in equal and opposite directions when the vehicle is leaned into a turn, said cambering device including a support member connected to said frame for pivotal movement about a first axis which extends longitudinally of the vehicle, a bell crank comprising a pair of wing members, each of said wing members carried by said support member for pivotal movement about an axis which is parallel to said first axis, gear means interconnecting said wing members for coordinating pivotal movement thereof about said laterally spaced axes, a pair of links, means pivotally connecting one of said links between one of said wing members and one of said trailing arms, means pivotally connecting the other of said links between the other of said wing members and the other of said trailing arms, each of said wing members having three positioning means formed therein located on a circle having its center coaxial with said axis which is parallel to said first axis, a spring biased lock pin carried by the support member and adapted to cooperate with said positioning means formed in said one of said wing members so as to selectively lock said wing members together in a first position wherein said trailing arms are located for normal operation of said vehicle, and in a second position wherein said trailing arms are located adjacent said frame for stowing said vehicle in a minimum of space, and a third position wherein said support member is prevented from pivoting about the first axis so as to allow said vehicle to be parked on a level surface.

3. In combination with a cambering vehicle having a steering frame provided with a pair of pivotally supported trailing arms, a mechanical cambering device for interconnecting the trailing arms so they move in equal and opposite directions when the vehicle is leaned into a turn, said cambering device including a support member connected to said frame for pivotal movement about a first axis, a bell crank comprising a pair of wing members carried by said support member for pivotal movement about a pair of laterally spaced axes which are parallel to said first axis, gear means interconnecting said wing members for coordinating pivotal movement thereof about said laterally spaced axes, a pair of links, means pivotally connecting one of said links between one of said wing members and one of said trailing arms, means pivotally connecting the other of said links between the other of said wing members and the other of said trailing arms, one of said wing members having three positioning means formed therein, a spring biased lock pin carried by the support member and adapted to cooperate with said positioning means formed in said one of said wing members so as to selectively lock said wing members together in a first position wherein said trailing arms are located for normal operation of said vehicle, and in a second position wherein said trailing arms are located adjacent said frame for stowing said vehicle in a minimum of space, and a third position wherein said support member is prevented from pivoting about the first axis so as to allow said vehicle to be parked on a level surface, and a pair of stop member attached to said steering frame and being located above and below said pair of laterally spaced axes for preventing pivotal movement of the support member about said first axis when said wing members are in said second and third positions.

* * * * *